United States Patent [19]
Hollomon

[11] Patent Number: 5,890,317
[45] Date of Patent: Apr. 6, 1999

[54] BAIT HOLDING ATTACHMENT FOR FISHHOOK

[76] Inventor: Michael E. Hollomon, P.O. Box 1653, Hwy. 87 South, Hemphill, Tex. 75948

[21] Appl. No.: 513,819
[22] PCT Filed: Mar. 1, 1994
[86] PCT No.: PCT/US94/02394
§ 371 Date: Jan. 18, 1996
§ 102(e) Date: Jan. 18, 1996
[87] PCT Pub. No.: WO94/19936
PCT Pub. Date: Sep. 15, 1994
[51] Int. Cl.[6] ............................. A01K 83/06; A01K 85/01
[52] U.S. Cl. ............................. 43/44.8; 43/44.2; 43/42.31; 43/42.37
[58] Field of Search .................... 43/44.2, 44.8, 43/42.24, 42.31, 42.37, 42.38, 42.29

[56] References Cited

U.S. PATENT DOCUMENTS

| | | | |
|---|---|---|---|
| 863,272 | 8/1907 | Gebhart | 43/44.8 |
| 1,323,394 | 12/1919 | Jones | 43/44.8 |
| 2,538,052 | 1/1951 | Schwarzer | 43/44.8 |
| 2,573,018 | 10/1951 | Herrick | 43/44.8 |
| 2,756,536 | 7/1956 | Ware | 43/44.8 |
| 2,922,247 | 1/1960 | Buss | 43/44.8 |
| 3,795,074 | 3/1974 | Mantel | 43/44.2 |
| 4,334,381 | 6/1982 | Carver et al. | 43/44.8 |
| 4,930,246 | 6/1990 | Cunninham | 43/44.8 |
| 5,009,026 | 4/1991 | Corbitt, III | 43/44.8 |
| 5,537,775 | 7/1996 | Crumrine | 43/42.38 |
| 5,673,508 | 10/1997 | Snyder | 43/44.8 |
| 5,784,827 | 7/1998 | Jimenez, Jr. et al. | 43/44.8 |

FOREIGN PATENT DOCUMENTS

| | | | |
|---|---|---|---|
| 1239000 | 7/1971 | United Kingdom | 43/44.8 |

Primary Examiner—Michael J. Carone
Assistant Examiner—Darren Ark
Attorney, Agent, or Firm—Sharp, Comfort & Merrett, P.C.

[57] ABSTRACT

A bait holding device is used to comprises a thin piece of wire having a generally central loop or U-shaped bend, with a small length of free ends of the wire being bent again into a V- or U-shape so as to form a hook-like portion at each of the two ends of the wire. The hook-like portions serve to secure the bait in place with respect to the hook, but do so without themselves damaging the bait. The thin wire may be secured by means of a small ferrule which is formed around both shanks of the wire near the central bend. The bait holding device may be attached to the eye of the fishhook, or may be attached about the shank so that it can freely slide along the shank between the eye and the barb of the hook. The wire used for the bait holding device is much thinner than the wire used to make the fishhook.

14 Claims, 2 Drawing Sheets

FIG. 1   FIG. 2   FIG. 3
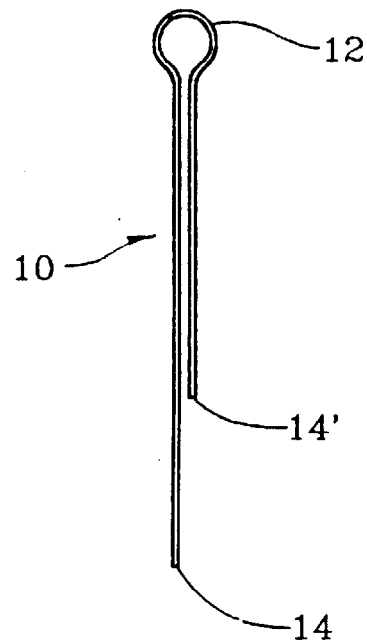
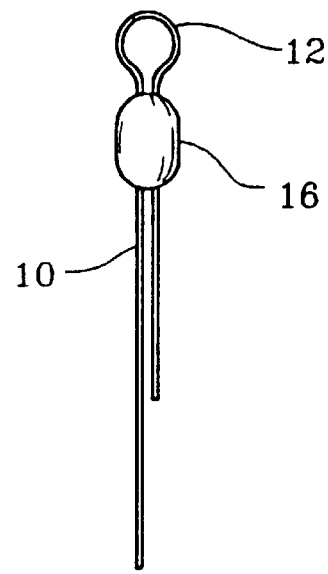
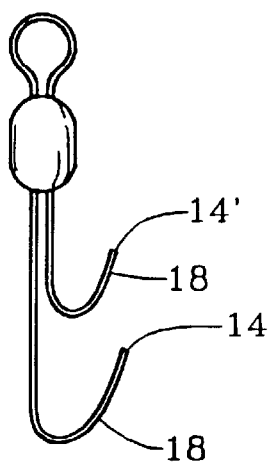
FIG. 4
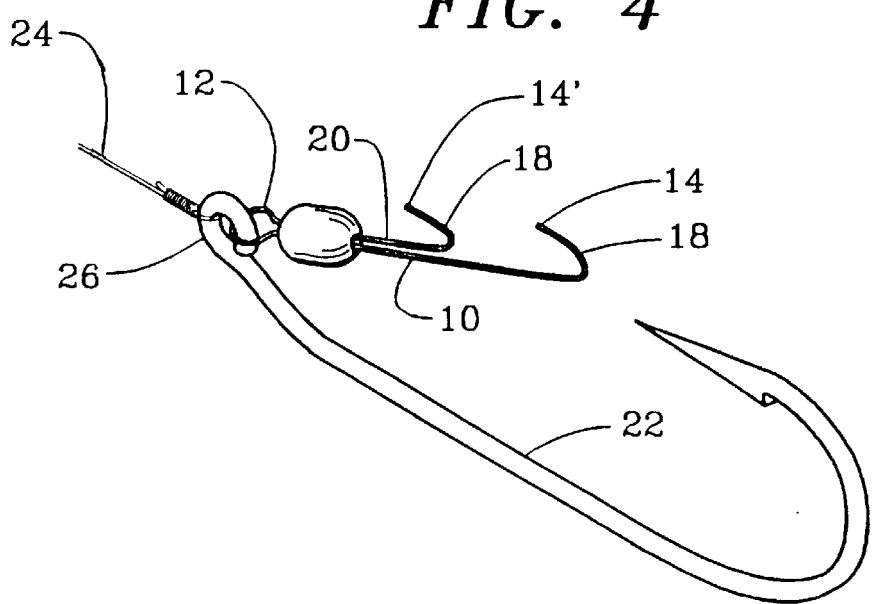

BAIT HOLDING ATTACHMENT FOR FISHHOOK

This invention relates to an improved bait holding attachment for fishhooks. More particularly, the invention relates to an improved, simplified arrangement for securing bait, both natural and artificial, onto a fishhook in different positions.

BACKGROUND AND OBJECTS OF THE INVENTION

In the field of sportfishing, a great variety of fishhooks have been developed, and similarly, a great number of different techniques have been developed for attaching bait to the hook. Some of the prior devices have been designed for use only with live bait, while others have been designed for artificial bait. Of course some such devices will work with both live and artificial bait.

The present invention is particularly suited for use with artificial bait, and more particularly with so-called soft plastic baits such as plastic worms, crawfish, grubs, snakes, and the like. In general, the textures of such baits are rather soft and of uniform texture. Frequently the baits are made to be very soft to more closely simulate a natural or living creature. The use of soft baits has grown tremendously in recent years, because of the improved technologies of the plastics used. The baits have become softer, and have also become more flexible.

Unfortunately, the use of soft, flexible plastic baits tends to give rise to more difficulty in keeping the bait on the hook. A soft, flexible bait generally is easier to tear or break as it is pulled through underwater brush, rocks, weeds, etc. As a result, the bait must be changed more frequently and the costs to the fisherman can increase. Some of the more common techniques used for attaching the bait to the hook involve passing the hook and barb completely through the body of the bait. In some techniques, only the tip of the hook is embedded in the soft plastic, while in other techniques, most of the shank of the hook is embedded.

One prior technique is disclosed in U.S. Pat. No. 4,334,381 of Carver, et al, and the technique used only involves the point of the hook being embedded in the soft plastic. To secure the bait in the desired position, the hook utilizes an additional element which is a straight, rigid rod attached to the eye of the hook. The rod has a number of barbs along the shank, and is inserted axially into the end of a bait such as a plastic worm. In this manner, the rigid rod secures the head end of the worm, while the point of the hook is embedded into the body of the worm. The rod, while being rigid, has one end pivotally attached to the eye of the hook, so that it has some degree of movement, but once the bait is secured, no significant further movement is possible, since the rigidity of the rod prevents substantial flexing of the bait. Further, since the rod is rigid and straight, some rigging techniques which utilize a curved worm body are to some extent inhibited by this type of hook arrangement. The rigid rod is also of a diameter substantially the same as, or even larger than, the diameter of the hook. This can cause tearing of the end of the worm during use, with the result that the worm would be discarded early.

Accordingly, it is a primary object of the present invention to provide an improved bait attaching device for fishing lures.

Another object of the present invention is to provide an improved bait attaching device for fishhooks which overcomes the disadvantages of the prior art.

Still another object of the present invention is to provide a flexible bait securing device for fishhooks.

Yet another object of the invention is to provide a bait attaching device which securely holds the bait in place, but which nonetheless retains a significant degree of flexibility.

Still a further object of the invention is to provide an improved bait securing device which may be attached either to the eye of the hook or may be attached to the shank of the hook so that it may be used to attach the bait closer to the throat of the hook.

These and other objects and advantages of this invention will become apparent from a detailed consideration of the following description.

DESCRIPTION OF THE INVENTION

According to the present invention, the bait holding device comprises a thin piece of wire having a generally central loop or U-shaped bend, with a small length of the free ends of the wire being bent again into a V- or U-shape so as to form a hook-like portion at each of the two ends of the wire. The hook-like portions serve to secure the bait in place with respect to the hook, but do so without themselves damaging the bait. The thin wire may be secured by means of a small ferrule which is formed around both shanks of the wire near the central bend. The bait holding device may be attached to the eye of the fishhook, or may be attached about the shank so that it can freely slide along the shank between the eye and the barb of the hook. The wire used for the bait holding device is much thinner than the wire used to make the fishhook, and is typically about 0.020 inch diameter.

The ferrule may be formed of metal or plastic, and may serve multiple functions as well. For example, if the ferrule is formed of lead, it may serve as a weight. The ferrule may be attached by hand, for example, to a hook so that the bait securing device may be attached to any hook by the user. Alternatively, the device may be attached by the hook manufacturer. Further, the ferrule may be formed of molded plastic, which is of course lightweight. The ferrule can also be hollow and contain small beads which then function as a rattle to generate noise when the lure is moved through the water. The ferrule may be a loose fit around the wires, such that it can slide along the wires, or it may be tightly crimped in place.

DESCRIPTION OF THE DRAWINGS

The invention will now be described in greater detail, with reference to the accompanying drawings which show by way of non-limiting example, a preferred form of the invention, and in which:

FIGS. 1, 2 and 3 are enlarged views illustrating the steps in the manufacture of a bait securing device according to this invention;

FIG. 4 is a perspective view of a fishhook showing the bait securing device attached to the eye of the hook;

DETAILED DESCRIPTION OF PREFERRED EMBODIMENTS

Figure 5:
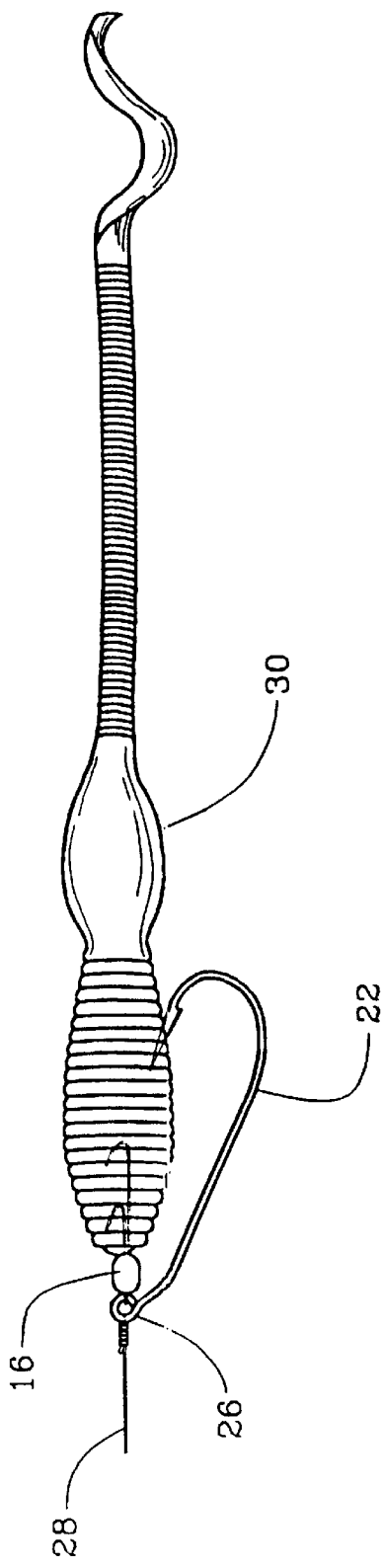
FIG. 5 is a plan view showing a plastic worm bait secured to a fishhook using the bait securing device of the present invention.

As best seen in FIGS. 1–3, a piece of wire 10 with a diameter of about 0.020" is bent so as to form a loop 12 near the mid-point of the wire 10. It is preferable to form the loop 12 slightly offset from the precise mid-point, in order that the ends 14, 14' will be slightly offset from each other. Most fishing hooks are made from wire having a diameter on the order of about 0.060–0.070 inch, i.e. significantly greater than that of the wire used in this invention.

A ferrule 16 is then positioned around the wire 10 near the loop 12. As indicated, this ferrule may metal or plastic sleeve, in which case it may be slipped over the double wire ends before the bends are formed, or may be a molded metal or plastic element. In addition, when the ferrule is preformed and slipped over the wire ends, once the wire ends 14, 14' are bent in the manner shown in FIG. 3, the bends serve to hold the ferrule on the wires without crimping. The ferrule may also be formed in such a manner that it does not slide on the wires once it is formed, as by being crimped in place.

Finally, the wire is bent near the ends 14, 14' so as to form small recurved portions in the nature of hooks 18 as seen in FIG. 3. While these bends may be U-shaped, in some cases it is preferable that they be sharper bends, more in the nature of V-shaped bends. In this manner, the "V" forms a point to facilitate insertion of the wires into the end of the bait.

The bend 12 of the wire 10 may be formed around the eye 26 of a fishhook, and in such case, the bait securing device 20 is attached to the fishhook 22 in the manner shown in FIG. 4. The small diameter of the wire of the device 20 does not interfere with tying a fishing line 24 to the eye 26. The wire 10 is considerably smaller in diameter than the wire which forms the fishhook, for example about a third of the diameter of the fishhook. In this manner, the wire need not be rigid, and is much more flexible than the fishhook with which it is used.

Figure 6:
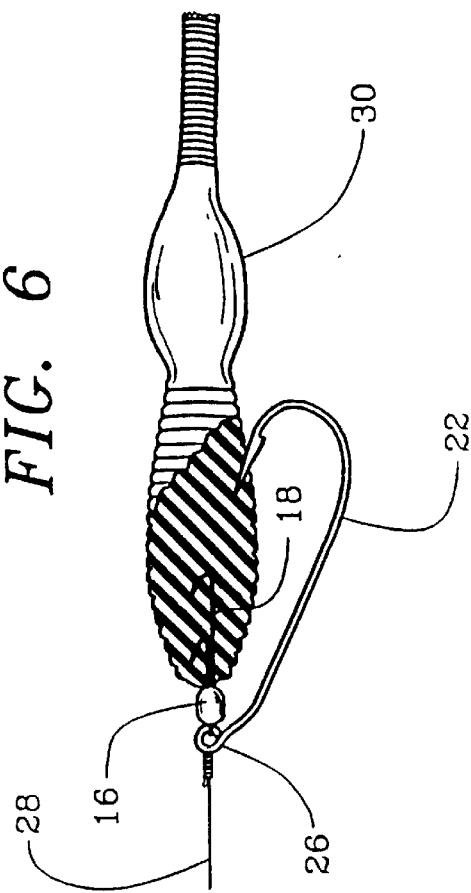
FIG. 6 is a fragmentary sectional view of a portion of the bait securing device showing the manner in which the device is embedded in the bait.

As shown in FIGS. 5 and 6, the fishhook 22 has an eye 26 which is attached to a fishing line 28, and the small wire ends 18 are embedded in the end of the bait, such as a plastic worm 30. Ordinarily the ferrule 16 would not be embedded in worm 30, although it is small enough that it would not damage the worm should the angler choose to embed the ferule in the end of the worm 30. In the case in which the ferrule is hollow and contains a freely moving bead inside the ferrule, the bead and ferrule would function as a rattle, which serves as an additional fish attractant. Other fish attractants could also be used instead of worms, for example strands of rubber or bundles of hair, both of which are commonly used on fishing lures. In such case, the hooks will help prevent the fish attractant from being pulled off of the lure. The ability to attach other types of baits or attractants with great flexibility is an important feature of this invention.

Figure 7:
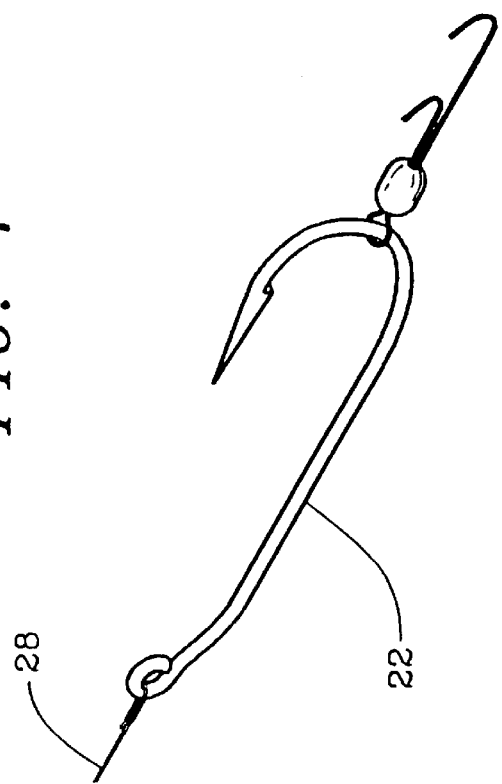
FIG. 7 is a perspective view showing an alternative manner of attaching the bait securing device to a fishhook.

In an alternate embodiment, the bait securing device may be attached around the shank of the hook as seen in FIG. 7. While in appearance this would be similar to a so-called trailer hook, the bait attaching device merely serves to secure the bait, and is not of sufficient strength or size to serve as a fish catching hook. Different baits or bait rigging styles require attachment of the bait in different positions, and as seen in FIG. 7, the bait may be attached behind or below the hook without the fishhook actually penetrating the bait. This arrangement better positions the fish attractant in relation to the point of the hook for better presentation, and to both conceal the hook and prevent it from being easily snagged on obstructions. For example, in the case of a so-called "swimming worm" technique, the midpoint of the plastic worm could be attached to the bait holding device a distance away from the end of the plastic worm at any point along the worm. In any case, the smaller diameter wire of the hook will prevent damage to a soft plastic bait, while still adequately securing the bait.

While this invention has been described as having certain preferred features and embodiments, it will be understood that it is capable of still further variation and modification without departing from the spirit of the invention, and this application is intended to cover any and all variations, modifications and adaptations which may fall within the spirit of the invention and the scope of the appended claims.

I claim:

1. A bait holding device for use in combination with a fish hook, comprising a length of wire having a mid-point and having a first and second end, a loop formed in the wire offset from the mid-point, the first end having a curved portion offset from the loop by a first distance, the second end having a curved portion offset from the loop by a second distance, a ferrule encompassing the wire between said loop and said first and second ends, said ferrule comprising a cavity and a bead contained therein.

2. The bait holding device of claim 1 further comprising a fishing hook having an eye portion, a shank portion and a hook portion, the eye portion of said hook being engaged with the loop of said bait holding device.

3. The combination of claim 2 wherein said length of wire has a diameter of about one third the diameter of the fishing hook.

4. The bait holding device of claim 1 wherein said length of wire has a diameter of about 0.020 inch.

5. The bait holding device of claim 1 wherein said ferrule serves to pivotally secure the bait holding device to the fishing hook.

6. The bait holding device of claim 1 further comprising a lure body removably attached to the first and second ends.

7. The combination of a fishhook and a bait holding device, said fishhook having an eye portion at one end, an intermediate shank portion and a book portion terminating in a point, and said bait holding device comprising a length of wire having a diameter significantly less than the wire of the fishhook, said bait holding device having a bend forming a loop near the midpoint thereof for encircling the wire forming said fishhook and two ends having small terminal bends, and a ferrule member secured to said bait holding device between said loop and said terminal bends for pivotally securing said bait holding device to said fishhook, wherein said ferrule comprises a cavity with a bead contained therein and is molded around the wire forming the bait holding device.

8. The combination of claim 7 and wherein said bait holding device is attached to said eye portion of said fishhook.

9. The combination of claim 1 and wherein said bait holding device is attached to said shank portion of said fishhook.

10. The combination of claim 7 and wherein said ferrule comprises a weight secured around said wire comprising said bait holding device.

11. The combination of claim 7 and wherein the wire forming said bait holding device has a diameter about one-third that of the wire forming the fishhook.

12. The combination of claim 7 and wherein said ferrule is a lead weight immovably affixed to said wire comprising said bait holding device.

13. The combination of claim 7 wherein the two ends of the bait holding device are at an offset distance from the bend forming a loop in the wire forming the bait holding device.

14. The combination of a fishhook and a bait securing device, said fishhook having an eye portion at one end, an intermediate shank portion and a hook portion terminating in a point, and said bait securing device comprising a length of wire having a diameter significantly less than the wire of the fishhook, said bait securing device having a bend forming a loop near the midpoint thereof for encircling a portion of said fishhook and two ends having small terminal U-bends, and a ferrule member surrounding and secured to said two ends between said loop and said terminal bends for retaining said bait holding device on said fishhook, and said ferrule member being hollow and enclosing a rattle.

* * * * *